US011900328B2

(12) United States Patent
Barcelos

(10) Patent No.: US 11,900,328 B2
(45) Date of Patent: Feb. 13, 2024

(54) REPORTING TAXONOMY

(71) Applicant: ADP, INC., Roseland, NJ (US)

(72) Inventor: Allan Barcelos, Porto Alegre (BR)

(73) Assignee: ADP, Inc., Roseland, NJ (US)

( * ) Notice: Subject to any disclaimer, the term of this patent is extended or adjusted under 35 U.S.C. 154(b) by 399 days.

(21) Appl. No.: 17/108,111

(22) Filed: Dec. 1, 2020

(65) Prior Publication Data
US 2022/0172174 A1   Jun. 2, 2022

(51) Int. Cl.
| | |
|---|---|
| *G06Q 10/1057* | (2023.01) |
| *G06Q 10/1053* | (2023.01) |
| *G06Q 10/1091* | (2023.01) |
| *G06Q 40/10* | (2023.01) |
| *G06Q 40/12* | (2023.01) |
| *G06Q 50/20* | (2012.01) |
| *G06Q 10/0639* | (2023.01) |
| *G06N 20/00* | (2019.01) |
| *G06N 5/04* | (2023.01) |
| *G06Q 40/08* | (2012.01) |
| *G06F 3/0482* | (2013.01) |

(52) U.S. Cl.
CPC ........... *G06Q 10/1057* (2013.01); *G06N 5/04* (2013.01); *G06N 20/00* (2019.01); *G06Q 10/06398* (2013.01); *G06Q 10/1053* (2013.01); *G06Q 10/1091* (2013.01); *G06Q 40/08* (2013.01); *G06Q 40/10* (2013.01); *G06Q 40/125* (2013.12); *G06Q 50/2057* (2013.01); *G06F 3/0482* (2013.01)

(58) Field of Classification Search
CPC ...... G06Q 10/06; G06Q 10/10; G06Q 10/105; G06Q 10/1053; G06Q 10/1057; Y10S 707/947
See application file for complete search history.

(56) References Cited

U.S. PATENT DOCUMENTS

| | | | |
|---|---|---|---|
| 2002/0026339 A1* | 2/2002 | Frankland | H04L 65/1069 707/E17.108 |
| 2009/0106059 A1* | 4/2009 | Megiddo | G06Q 10/063114 705/7.15 |
| 2013/0173649 A1* | 7/2013 | Chmiel | G06F 16/24578 707/765 |

(Continued)

OTHER PUBLICATIONS

Greenstein-Messica, Asnat, and Lior Rokach. "Personal price aware multi-seller recommender system: Evidence from eBay." Knowledge-Based Systems 150 (2018): 14-26. (Year: 2018).*

(Continued)

*Primary Examiner* — Brendan S O'Shea
(74) *Attorney, Agent, or Firm* — Foley & Lardner LLP

(57) ABSTRACT

A method, computer system, and computer program product are provided for managing reports. A subset of data fields is identified for inclusion in a new report. An intent of the new report is determined based on the subset of data fields. The intent is determined using a set of machine learning models trained from a set of existing reports and a taxonomy of human capital management (HCM) information. Based on the intent determined by the artificial intelligence system, a set of additional fields is predicted for the new report. The set of the additional fields is displayed in a graphical user interface on a display system.

21 Claims, 9 Drawing Sheets

(56) References Cited

U.S. PATENT DOCUMENTS

2018/0330248 A1* 11/2018 Burhanuddin ......... G06N 20/00
2019/0392541 A1* 12/2019 Regier ................... G06N 20/00

OTHER PUBLICATIONS

"Weighted sum of two distributions" StackExchange Mathematics, Sep. 26, 2017; available at: https://math.stackexchange.com/questions/2445496/weighted-sum-of-two-distributions (Year: 2017).*
Staron, Miroslaw, et al "Selecting the right visualization of indicators and measures-dashboard selection model." Software Measurement: 25th International Workshop on Software Measurement Krakow, Poland, Oct. 5-7, 2015, Proceedings 25. Springer International Publishing, 2015 (Year: 2015).*

* cited by examiner

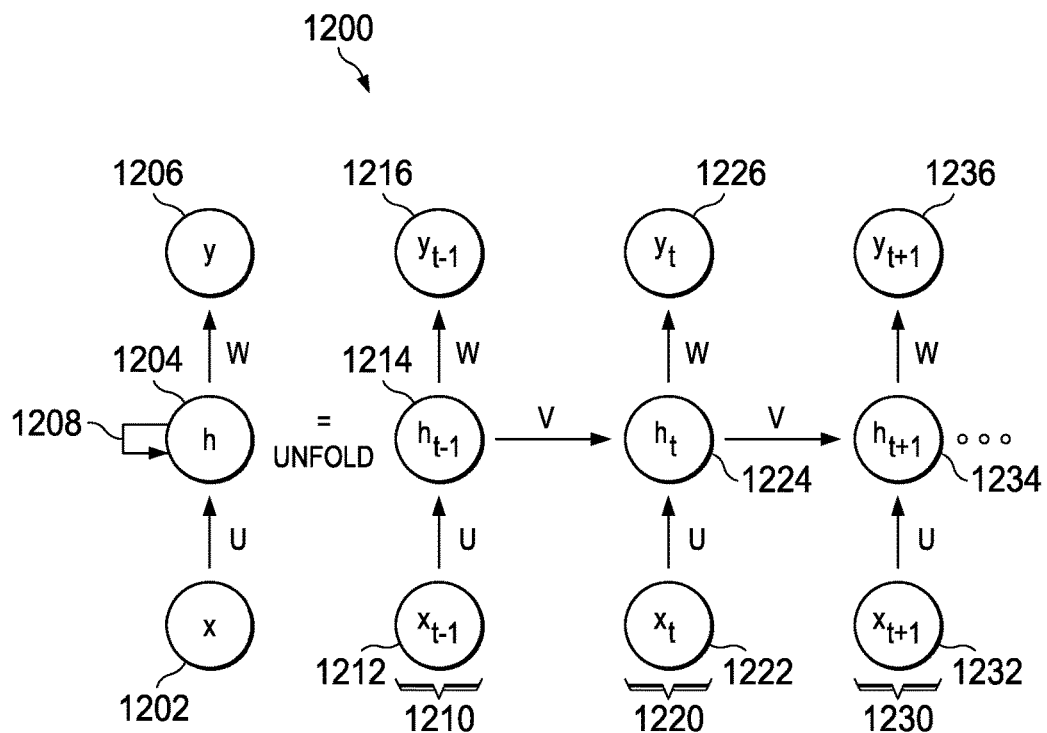
FIG. 12
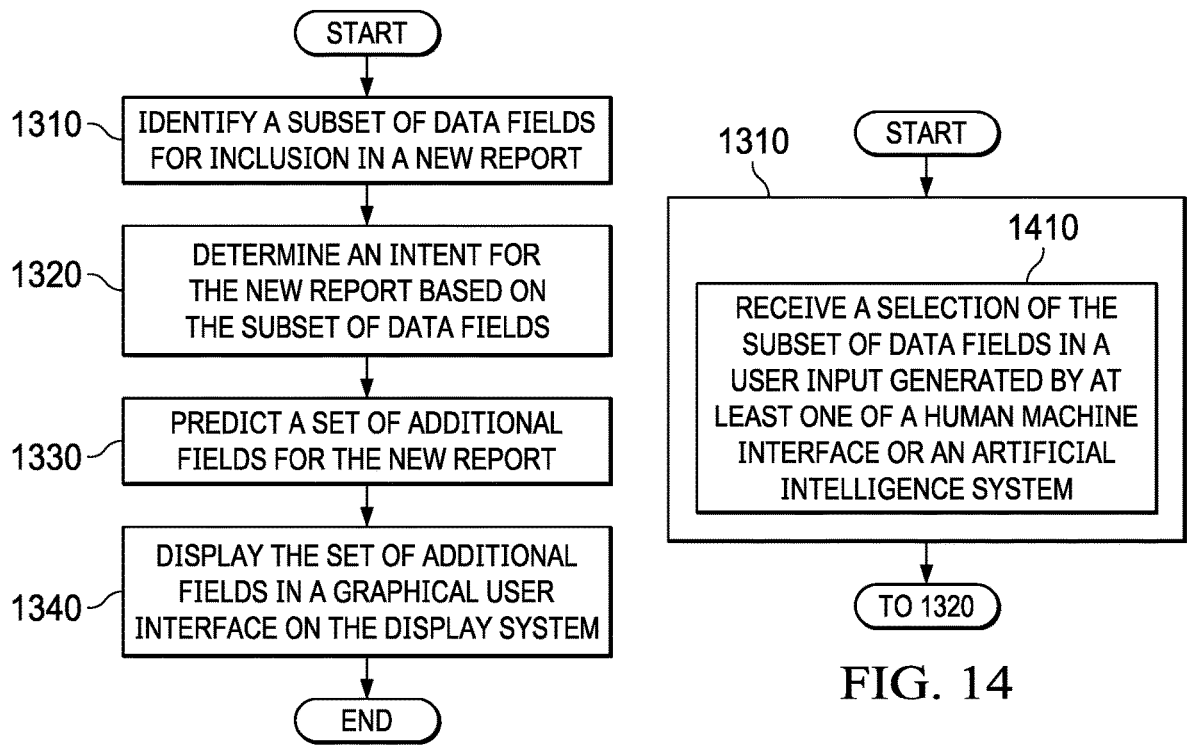
FIG. 13
FIG. 14

REPORTING TAXONOMY

BACKGROUND INFORMATION

1. Field

The present disclosure relates generally to an improved computer system and, in particular, to a method and apparatus for managing reports. Still more particularly, the present disclosure relates to a method and apparatus for creating new reports for applications.

2. Background

Information systems are used for many different purposes. The different operations performed using the information system may be referred to as transactions. For example, an information system may be used to process payroll to generate paychecks for employees in an organization. The different operations performed to generate paychecks for a pay period using the information system may be referred to as a transaction.

Additionally, an information system also may be used by a human resources department to maintain benefits and other records about employees. For example, a human resources department may manage health insurance, wellness plans, and other programs in an organization using an employee information system. As yet another example, an information system may be used to determine when to hire new employees, assign employees to projects, perform reviews for employees, and other suitable operations for the organization.

Other uses of information systems include purchasing equipment and supplies for an organization. In yet another example, information systems may be used to plan and rollout a promotion of a product for an organization.

Often times, an operator may desire to generate a report for a particular type of transaction. Currently, an operator may use software to generate human-readable reports from different sources, such as databases in the information systems. Currently available report generator software is often more difficult to use than desired.

This type of software requires the operator to have knowledge about how information is stored, to select what information to use in a report. For example, the operator may need to know what fields, tables, or columns in the database should be selected for including desired information in the report.

As a result, an operator may need to have experience or training with respect to report generator software and databases in addition to the experience and training to perform the transaction for which the report is being generated. This additional skill may limit the number of operators who are able to generate reports. Additionally, operators who do not generate reports very often may find that report generating may take more time and may be more difficult than desired.

Therefore, it would be desirable to have a method and apparatus that take into account at least some of the issues discussed above, as well as other possible issues. For example, it would be desirable to have a method and apparatus that overcome the technical problem with operators being unable to generate reports as efficiently as desired without knowledge about how the information is stored.

SUMMARY

An embodiment of the present disclosure provides a computer-implemented method for generating reports. The method comprises identifying, by a computer system, a subset of data fields for inclusion in a new report; determining, by an artificial intelligence system in the computer system, an intent for the new report based on the subset of data fields, wherein the intent is determined using a set of machine learning models trained from a set of existing reports and a taxonomy of Human Capital Management (HCM) information; predicting, by the artificial intelligence system based on the intent determined by the artificial intelligence system, a set of additional fields for the new report; and displaying, by the computer system on a display system, the set of additional fields in a graphical user interface on the display system Another embodiment of the present disclosure provides a report management system comprising a computer system and a report manager in the computer system. The report manager is configured to identify a subset of data fields for inclusion in a new report; to determine, using an artificial intelligence system in the computer system, an intent for the new report based on the subset of data fields, wherein the intent is determined using a set of machine learning models trained from a set of existing reports and a taxonomy of Human Capital Management (HCM) information; to predict, using the artificial intelligence system based on the intent determined by the artificial intelligence system, a set of additional fields for the new report; and to display the set of additional fields in a graphical user interface on the display system.

Yet another embodiment of the present disclosure provides a computer program product for managing reports. The computer program product comprises a computer readable storage media, and program code stored on the computer-readable storage media. The program code includes code for identifying, by a computer system, a subset of data fields for inclusion in a new report; code for determining, by an artificial intelligence system in the computer system, an intent for the new report based on the subset of data fields, wherein the intent is determined using a set of machine learning models trained from a set of existing reports and a taxonomy of Human Capital Management (HCM) information; code for predicting, by the artificial intelligence system based on the intent determined by the artificial intelligence system, a set of additional fields for the new report; and code for displaying, by the computer system on a display system, the set of additional fields in a graphical user interface on the display system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 12 is a diagram illustrating a neural network in which illustrative embodiments can be implemented;

FIG. 13 is a flowchart illustrating a process for managing reports depicted in accordance with an illustrative embodiment;

FIG. 14 is a flowchart illustrating a process for identifying a subset of data fields for inclusion in a new report depicted in accordance with an illustrative embodiment;

DETAILED DESCRIPTION

Figure 1:
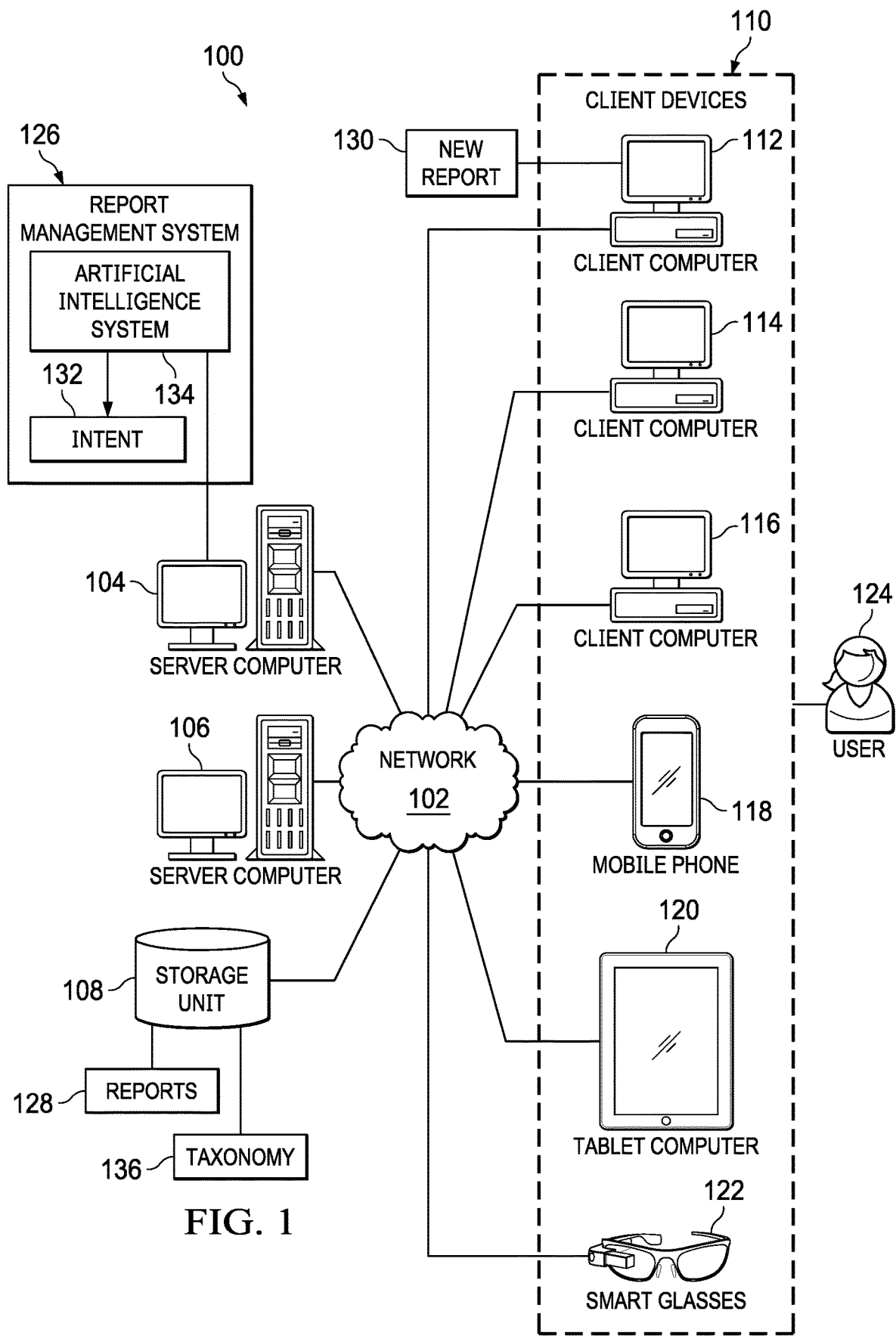
FIG. 1 is a pictorial representation of a network of data processing systems depicted in which illustrative embodiments may be implemented.

The illustrative embodiments recognize and take into account one or more different considerations. For example, the illustrative embodiments recognize and take into account that the process currently used to generate reports may be more cumbersome and difficult than desired. For example, an operator, who desires to generate a report for a transaction being performed using an application, exits or leaves the application and starts a new application for generating reports, such as currently used report generator software.

The illustrative embodiments also recognize and take account that currently available report generator software uses the names of columns, fields, tables, or other data structures in presenting selections to an operator. The illustrative embodiments recognize and take into account that often times, the names used in a database may not be the same as the name of the field as displayed in the application used by the operator to perform the transaction.

Thus, those embodiments provide a method and apparatus for managing reports. In particular, a method may be present that helps an operator generate a new report more quickly and easily as compared to currently available report generator software.

In one illustrative example, a computer-implemented method is provided for generating reports. A computer system identifies a subset of data fields for inclusion in a new report. An artificial intelligence system in the computer system determines an intent for the new report based on the subset of data fields. The intent is determined using a set of machine learning models trained from a set of existing reports and a taxonomy of Human Capital Management (HCM). The artificial intelligence system predicts a set of additional fields for the new report based on the intent determined by the artificial intelligence system. The computer system displays the set of additional fields in a graphical user interface on a display system.

As used herein, "a group of", when used with reference to items, means one or more items. For example, "a group of reports" is one or more reports.

Further, the phrase "a set of" or "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, a field is a space that holds a piece of data. The space may be, for example, in a location in a record for a database. As another example, the space may be in a location of memory of a computer system. When the space is in an application, the space may be in a data structure in the application.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within Network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet-of-things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, Network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

In this illustrative example, user 124 can use one or more of client devices 110 to interact with report management system 126. Report management system 126 is an application for creating and managing reports 128.

The sheer number of fields in some data sets sometimes makes the users struggle with traditional reporting applications, and could lead them to be confused about which fields, filters, derived, or calculated fields they should select. However, users typically know their report subject (context) and what kind of information they want put into a report.

Every report created by report management system 126 has a purpose and an objective, which leads to the intention of the report owner. When user 124 creates new report 130 using report management system 126, the information selected by a user provides insights as to which kind of report they want.

In this illustrative example, report management system 126 determines intent 132 of a new report 130. Intent 132 is the intention of new report 130, and characterizes the intention of the report owner. In this illustrative example, report management system 126 determines intent 132 using artificial intelligence system 134 that employs taxonomy 136.

Current reporting tools and reports used by existing systems do not classify reports according to a taxonomy. These existing systems allow generic artificial intelligence approaches to enhance the user experience. However, these generic approaches are not aware of the user intent, and do not understand how or when to interact with users to facilitate creation of a new report.

When taxonomy 136 is used in artificial intelligence system 134, report management system 126 provides a technical solution that overcomes a technical problem of quickly and easily generating new reports. Report management system 126 can information for inclusion in new report 130, based on the intent 132 as determined by artificial intelligence system 134 according to taxonomy 136. Identifying information in this manner enables user 124 to create new report 130 more easily and quickly. As a result, this technical solution to the technical problem of generating reports provides a technical effect in which new reports are generated more easily and quickly while requiring less knowledge or training from an operator.

Figure 2:
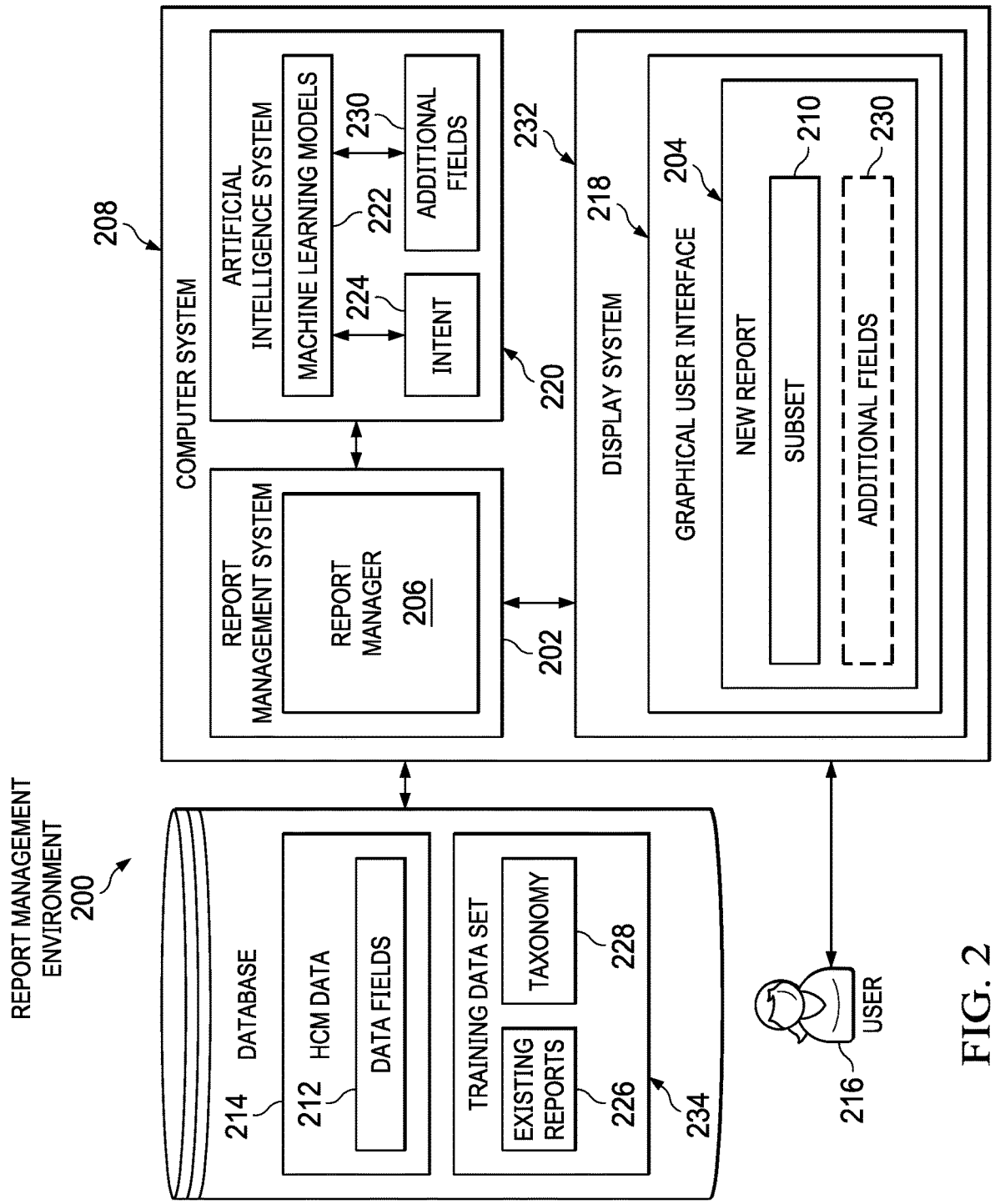
FIG. 2 is a block diagram of report management environment depicted in accordance with an illustrative embodiment.

With reference now to FIG. 2, a block diagram of report management environment is depicted in accordance with an illustrative embodiment. In this illustrative example, report management environment 200 includes components that can be implemented in hardware such as the hardware shown in network data processing system 100 in FIG. 1.

As depicted, report management environment 200 is an environment in which report management system 202 provides services for generating new report 204. As depicted, report management environment 200 includes report management system 202. Report management system 202 is an example of report management system 126 of FIG. 1.

Report manager 206 can be implemented in software, hardware, firmware or a combination thereof. When software is used, the operations performed by report manager 206 can be implemented in program code configured to run on hardware, such as a processor unit. When firmware is used, the operations performed by report manager 206 can be implemented in program code and data and stored in persistent memory to run on a processor unit. When hardware is employed, the hardware may include circuits that operate to perform the operations in report manager 206.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Report management system 202 can be implemented in computer system 208. Computer system 208 is a physical hardware system and includes one or more data processing systems. When more than one data processing system is present in computer system 208, those data processing systems are in communication with each other using a communications medium. The communications medium may be a network. The data processing systems may be selected from at least one of a computer, a server computer, a tablet, or some other suitable data processing system. When a number of processors execute instructions for a process, the number of processors can be on the same computer or on different computers in computer system 208. In other words, the process can be distributed between processors on the same or different computers in computer system 208.

In this illustrative example, report management system 202 identifies a subset 210 of data fields 212 for inclusion in a new report 204. Data fields 212 are spaces for pieces of data. For example, in a relational database table, the columns of the table are the fields. The rows of the table are records. The records in the table are values for the fields. Fields are spaces where pieces of data are located. These pieces of data are used to perform transactions. Data stored in data fields 212 can be human capital management (HCM) data 214 generated in providing human resources services. For example, in a payroll application, the fields can include at least one of salary, tax information, benefits information, or other suitable types of payroll data.

In this illustrative example, report management system 202 can identify subset 210 of data fields 212 in a number of different ways. For example, report management system 202 can receive user input that contains a selection of one or more of data fields 212. User input can be generated by at least one of a human machine interface of an artificial intelligence system, an expert system, or some other suitable process. The human machine interface comprises an input system and a display system that enables user 216 to interact with report management system 202. In one illustrative example, user 216 can select one or more of data fields 212 from a list displayed in a graphical user interface 218.

In this illustrative example, artificial intelligence system 220 is located in computer system 208 and comprises one or more machine learning models 222. Artificial intelligence system 220 is a system that has intelligent behavior and can be based on function of the human brain. Artificial intelligence system 220 comprises at least one of an artificial neural network, an artificial neural network with natural language processing, a cognitive system, a Bayesian network, a fuzzy logic, an expert system, a natural language system, a cognitive system, or some other suitable system.

Machine learning is used to train the artificial intelligence system 220. Machine learning involves inputting data to the process and allowing the process to adjust and improve the function of the artificial intelligence system. In one illustrative example, artificial intelligence system 220 operates to train one or more of machine learning models 222 for use in characterizing the intent 224 in a supervised learning process.

During a supervised learning the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include regression analysis, decision trees, k-nearest neighbors, neural networks, and support vector machines.

In one illustrative example, the machine learning models 222 comprises a recurrent neural network. When the machine learning models 222 is a recurrent neural network, generating the set of additional fields 230 can include predicting additional fields 230 according to the intent 224 of the new report 204. For each suggested field predicted by the recurrent neural network, a probability density function can be computed, for example using a number of fully connected neural networks. A weighted average of the probability density functions is then calculated.

The set of machine learning models 222 is trained from a set of existing reports 226 and a taxonomy 228 of human capital management (HCM) data categories. When trained using an appropriate training data set 234, one or more of machine learning models 222 can be used to identify and suggest data fields 212 for inclusion in new report 204 based on the intent 224 of new report 204.

Taxonomy 228 is a hierarchical classification scheme for organizing existing reports 226. Report management system 202 uses taxonomy 228 to categorize existing reports 226 during training of machine learning models 222. Machine learning models 222 that are trained using taxonomy 228 are HCM information-aware, enabling report management system 202 to understand the needs of a user when creating new report 204. Machine learning models 222 that are trained using taxonomy 228 enable report management system 202 to proactively interact with user when creating new report 204.

Artificial intelligence system 220 can validate training of machine learning models 222 using validation data, which can include in and use a subset of existing reports 226. Artificial intelligence system 220 analyzes the process and results of validation data to determine whether artificial intelligence system 220 performs with a desired level of accuracy. When a desired level of accuracy is reached, report management system 202 can predict intent 224 of a new report 204.

In this illustrative example, report management system 202 uses set of machine learning models 222 to determine intent 224 of new report 204. For example, report management system 202 can generate an index of data fields 212 according to intent 224 of existing reports 226, as determined by the machine learning models 222. According to the index, report management system 202 can identify additional fields 230 for inclusion in new report 204, based on the intent 224 for the new report 204. The additional fields 230 can be presented in a graphical user interface 218 of a display system 232.

In this illustrative example, report management system 202 predicts set of additional fields 230 based on the intent 224 of the new report 204, as determined by the artificial intelligence system 220. For example, using one or more machine learning models 222, report management system 202 can determine additional fields 230 based on intent 224 of new report 204. When trained, each of machine learning models 222 can be used to identify additional fields 230 from data fields 212. For example, one or more machine learning models 222 can take intent 224 as input, and probabilistically determine which of data fields 212 are likely to be selected for inclusion in new report 204. Report management system 202 can then display the set of the additional fields 230 in a graphical user interface of a display system, such as on one or more of client devices ABC.

In one illustrative example, report manager 206 ranks the set of additional fields 230 based on the weighted average of the probability density functions determined by the recurrent neural network. The ranked set of suggested fields form a ranked order. Report manager 206 displays the set of additional fields 230 according to the ranked order.

In one illustrative example, report manager 206 makes real-time determinations of additional fields 230 as subset 210 is identified and included in the new report 204. That is, report manager 206 redetermines the intent 224 of the new report 204 as data fields 212 are added to the subset 210. In other words, in response to receiving a user input selecting an additional fields 230, the report manager 206 re-determines the intent 224 of the new report 204 based on the subset 210, including the additional fields 230. Using one or more of machine learning models 222, the report manager 206 then determines a second set of additional fields 230 based on the redetermined intent 224 of the new report 204. The report manager 206 then displays the second set of additional fields 230 in the graphical user interface 218 on the display system 232.

Computer system 208 can be configured to perform at least one of the steps, operations, or actions described in the different illustrative examples using software, hardware, firmware or a combination thereof. As a result, computer system 208 operates as a special purpose computer system in which report manager 206 and taxonomy 228 in computer system 208 enables training an artificial intelligence system 220 to generate new report 204. In the illustrative example, the use of artificial intelligence system 220 in computer system 208 integrates processes into a practical application for a method of training an artificial intelligence system that increases the performance of computer system 208. In other words, artificial intelligence system 220 into in computer system 208 is directed towards a practical application of processes integrated into artificial intelligence system 220 in computer system 208 that identifies intentions from previously generated existing reports 226.

In this illustrative example, report management system 202 in computer system 208 utilizes existing reports 226 and taxonomy 228 to train an artificial intelligence system 220 using one or more machine learning algorithms in a manner that that results in an artificial intelligence system 220 that is capable of identifying additional fields 230 for new report 204 with a desired level of accuracy. In this manner, artificial intelligence system 220 for in computer system 208 provides a practical application of a method for training an artificial intelligence system 220 to characterize a new report 204 such that the functioning of computer system 208 is improved when using the trained artificial intelligence system 220.

Figure 3:
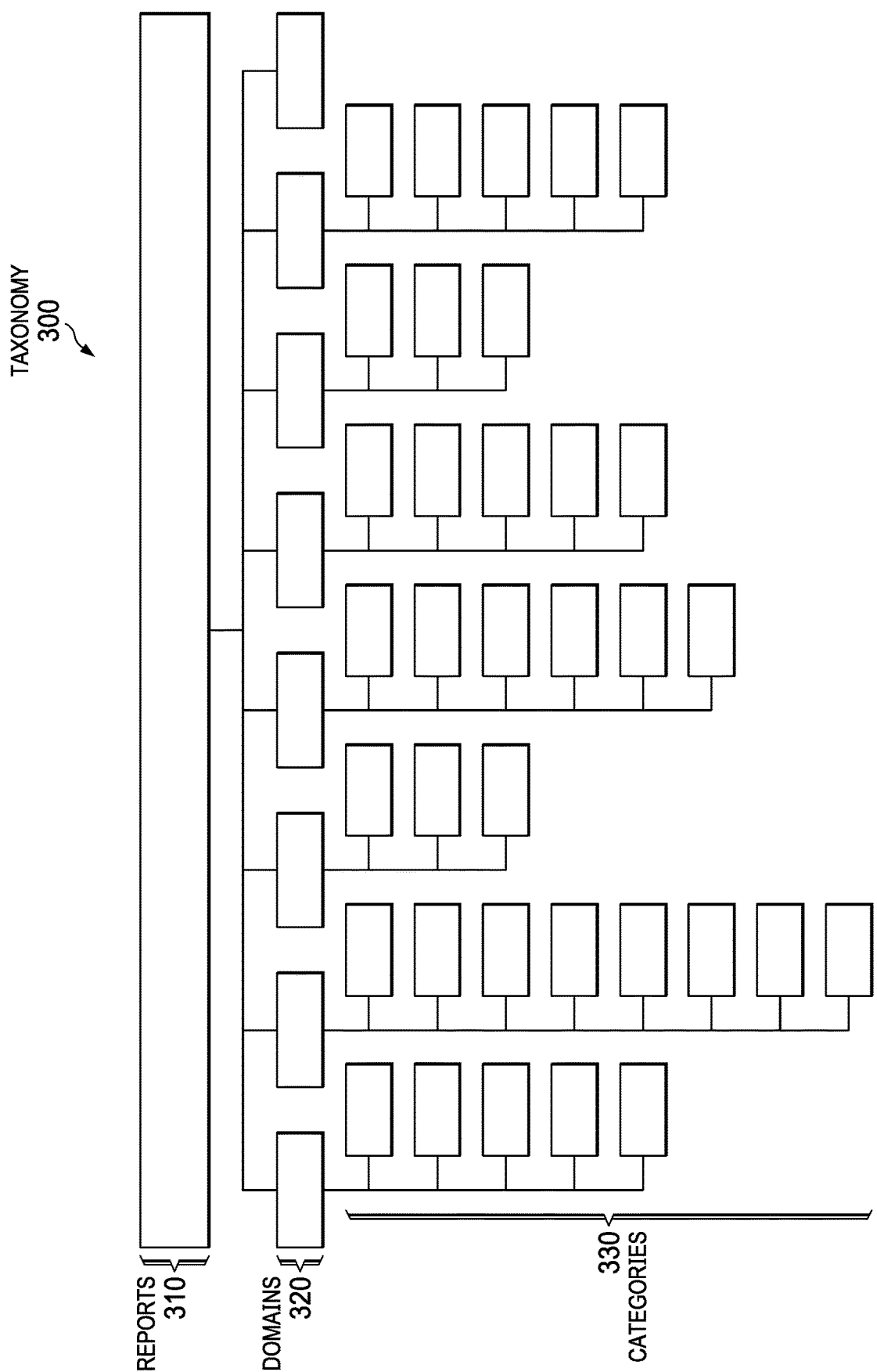
FIG. 3 is a block diagram that illustrates a taxonomy in which illustrative embodiments can be implemented.

Referring now to FIG. 3, a block diagram is shown that illustrates a taxonomy in which illustrative embodiments can be implemented. Taxonomy 300 is an example of taxonomy 228, shown in block form in FIG. 2.

As depicted, taxonomy 300 is a hierarchical classification scheme for organizing reports 310 according to a number of human capital management (HCM) information categories. Reports 310 can be classified into domains 320 and categories 330, according to a determined intent of the reports 310.

Figure 4:
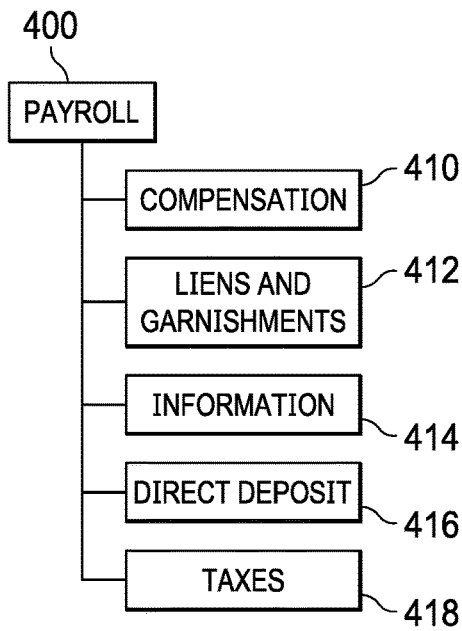
FIG. 4 is a block diagram illustrating a first domain of a taxonomy of Human Capital Management information in which illustrative embodiments can be implemented.

Referring now to FIG. 4, a block diagram of a first domain of a taxonomy of Human Capital Management information is shown in which illustrative embodiments can be implemented. Domain 400 is an example of one of domains 320 of FIG. 3, for organizing reports according to a number of human capital management (HCM) information categories.

As depicted, domain 400 is a "payroll" domain, and includes categories 410-418. Each of categories 410-418 is an example of one of categories 330 of FIG. 3, for organizing reports according to a number of human capital management (HCM) information categories.

As depicted, domain 400 includes category 410 "compensation", category 412 "liens & garnishment", category 414 "information", category 416 "direct deposit", and category 418 "taxes". Each of categories 410-418 may correspond to an intent of the report, such as intent 224 of FIG. 2, as determined by an artificial intelligence system, such as artificial intelligence system 220 of FIG. 2.

As depicted, category 410 may correspond to one or more intent related to compensation. These intents may include, but are not limited to, 401(k), accrual balance, accrual paycheck, active employee, bonus, cares, commission, compensation, deductions, earnings, FLSA, history, hourly rate, job commission, memos, monthly payroll, overtime, pay balance, pay range, paycheck, salaries, and wage compensation.

As depicted, category 414 corresponds to one or more intent related to information. These intents may include, but are not limited to, headcount, payroll detail, and summary.

As depicted, category 416 corresponds to one or more intent related to compensation. These intents may include, but are not limited to, direct deposit.

Figure 5:
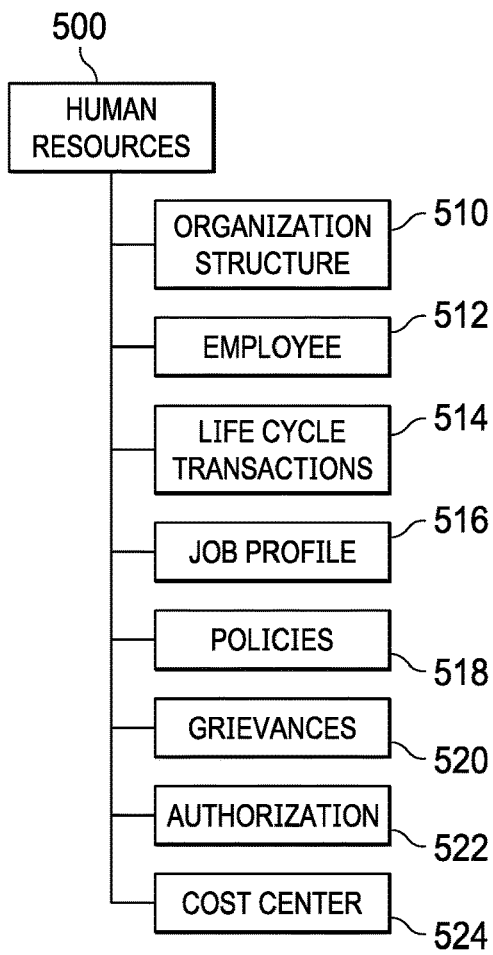
FIG. 5 is a block diagram illustrating a second domain of a taxonomy of Human Capital Management information of Human Capital Management information in which illustrative embodiments can be implemented.

Referring now to FIG. 5, a block diagram of a second domain of a taxonomy of Human Capital Management information is shown in which illustrative embodiments can be implemented. Domain 500 is an example of one of domains 320 of FIG. 3, for organizing reports according to a number of human capital management (HCM) information categories.

As depicted, domain 500 is an "Human Resources" domain, and includes categories 510-524. Each of categories 510-524 is an example of one of categories 330 of FIG. 3, for organizing reports according to a number of human capital management (HCM) information categories.

As depicted, domain 500 includes category 510 "organization structure", category 512 "employee", category 514 "lifecycle transactions", category 516 "job profile", category 518 "policies", category 520 "grievances", category 522 "authorization", and category 524 "cost center". Each of categories 510-524 may correspond to an intent of the report, such as intent 224 of FIG. 2, as determined by an artificial intelligence system, such as artificial intelligence system 220 of FIG. 2.

As depicted, category 510 may correspond to one or more intent related to organization structure. These intents may include, but are not limited to, allocations, cost detail, secondary job, supervisor/employee, and teammate.

As depicted, category 512 may correspond to one or more intent related to employee. These intents may include, but are not limited to, active employee, anniversary, audit, synthesis, headcount, higher, secondary job, seniority, and year of service.

As depicted, category 514 may correspond to one or more intent related to lifecycle transactions. These intents may include, but are not limited to, compensation, cost center, direct deposit, higher, leaves, monthly higher, movements, new hire, promotions, retention, secondary job, termination, transfers, and turnover.

As depicted, category 516 may correspond to one or more intent related to job profile. These intents may include, but are not limited to, ACA, cares, and secondary job.

As depicted, category 518 may correspond to one or more intent related to policies. These intents may include, but are not limited to, accommodations, disability, and employment equity.

As depicted, category 522 may correspond to one or more intent related to authorization. These intents may include, but are not limited to, authorization.

As depicted, category 524 may correspond to one or more intent related to organization structure. These intents may include, but are not limited to, allocations, cost center, and transfers.

Figure 6:
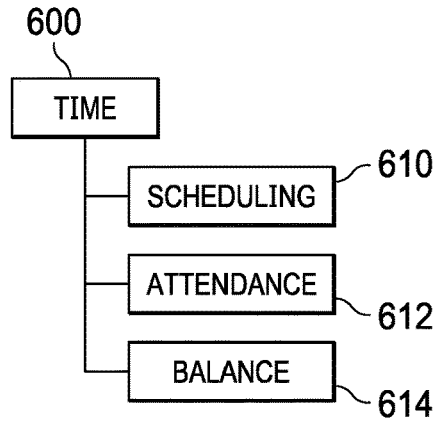
FIG. 6 is a block diagram illustrating a third domain of a taxonomy of Human Capital Management information in which illustrative embodiments can be implemented.

Referring now to FIG. 6, a block diagram of a third domain of a taxonomy of Human Capital Management information is shown in which illustrative embodiments can be implemented. Domain 600 is an example of one of domains 320 of FIG. 3, for organizing reports according to a number of human capital management (HCM) information categories.

As depicted, domain 600 is an "time" domain, and includes categories 610-614. Each of categories 610-614 is an example of one of categories 330 of FIG. 3, for organizing reports according to a number of human capital management (HCM) information categories.

As depicted, domain 600 includes category 610 "scheduling", category 612 "attendance", and category 614 "balance". Each of categories 610-614 may correspond to an intent of the report, such as intent 224 of FIG. 2, as determined by an artificial intelligence system, such as artificial intelligence system 220 of FIG. 2.

As depicted, category 610 may correspond to one or more intent related to scheduling. These intents may include, but are not limited to, earnings, and time request.

As depicted, category 612 may correspond to one or more intent related to attendance. These intents may include, but are not limited to, absences, sick balance, and time off.

As depicted, category 614 may correspond to one or more intent related to balance. These intents may include, but are not limited to, overtime, time balance, and vacation liability.

Figure 7:
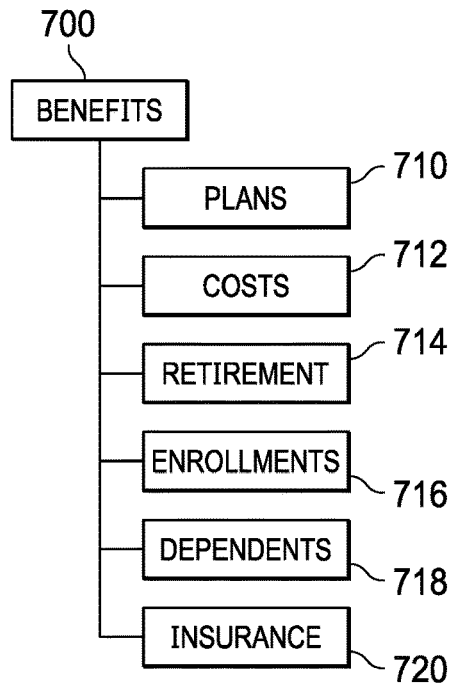
FIG. 7 is a block diagram illustrating a fourth domain of a taxonomy of Human Capital Management information in which illustrative embodiments can be implemented.

Referring now to FIG. 7, a block diagram of a fourth domain of a taxonomy of Human Capital Management information is shown in which illustrative embodiments can be implemented. Domain 700 is an example of one of domains 320 of FIG. 3, for organizing reports according to a number of human capital management (HCM) information categories.

As depicted, domain 700 is a "benefits" domain, and includes categories 710-720. Each of categories 710-720 is an example of one of categories 330 of FIG. 3, for organizing reports according to a number of human capital management (HCM) information categories.

As depicted, domain 700 includes category 710 "plans", category 712 "costs", category 714 "retirement", category 716 "enrollments", category 718 "dependents", and category 720 "insurance". Each of categories 710-720 may correspond to an intent of the report, such as intent 224 of FIG. 2, as determined by an artificial intelligence system, such as artificial intelligence system 220 of FIG. 2.

As depicted, category 710 may correspond to one or more intent related to benefit plans. These intents may include, but are not limited to, census, enrollments, benefit election, Social Security, and summary.

As depicted, category 712 may correspond to one or more intent related to benefit costs. These intents may include, but are not limited to, deductions, paycheck, pet insurance, and summary.

As depicted, category 714 may correspond to one or more intent related to retirement benefits. These intents may include, but are not limited to, 401(k), census, and deductions.

As depicted, category 716 may correspond to one or more intent related to enrollment benefits. These intents may include, but are not limited to, benefit changes, benefit elections, new hires, rehires, and status.

As depicted, category 718 may correspond to one or more intent related to dependents. These intents may include, but are not limited to, census, and plan coverage.

As depicted, category 720 may correspond to one or more intent related to insurance benefits. These intents may include, but are not limited to, cobra, health, and pet insurance.

Figure 8:
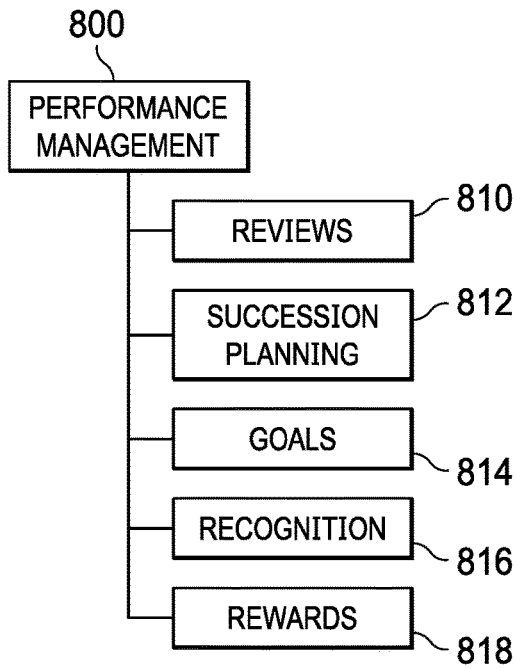
FIG. 8 is a block diagram illustrating a fifth domain of a taxonomy of Human Capital Management information in which illustrative embodiments can be implemented.

Referring now to FIG. 8, a block diagram of a fifth domain of a taxonomy of Human Capital Management information is shown in which illustrative embodiments can be implemented. Domain 800 is an example of one of domains 320 of FIG. 3, for organizing reports according to a number of human capital management (HCM) information categories.

As depicted, domain 800 is an "performance management" domain, and includes categories 810-818. Each of categories 810-818 is an example of one of categories 330 of FIG. 3, for organizing reports according to a number of human capital management (HCM) information categories.

As depicted, domain 800 includes category 810 "reviews", category 812 "succession planning", category 814 "goals", category 816 "recognition", and category 818 "rewards". Each of categories 810-818 may correspond to an intent of the report, such as intent 224 of FIG. 2, as determined by an artificial intelligence system, such as artificial intelligence system 220 of FIG. 2.

As depicted, category 810 may correspond to one or more intent related to reviews. These intents may include, but are not limited to, history, performance evaluation, and performance review.

As depicted, category 816 corresponds to one or more intent related to recognition. These intents may include, but are not limited to, bonus, commission, and job commission.

As depicted, category 818 corresponds to one or more intent related to rewards. These intents may include, but are not limited to, bonus and incentive.

Figure 9:
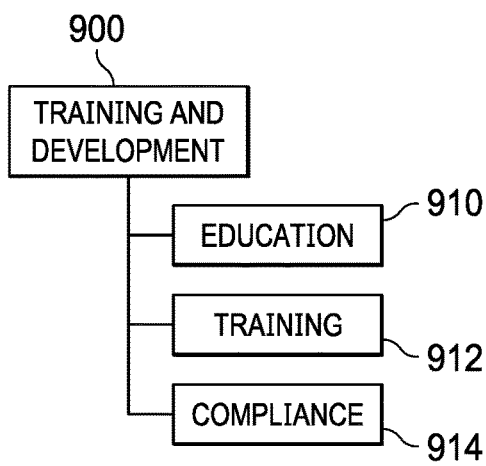
FIG. 9 is a block diagram illustrating a sixth domain of a taxonomy of Human Capital Management information in which illustrative embodiments can be implemented.

Referring now to FIG. 9, a block diagram of a sixth domain of a taxonomy of Human Capital Management information is shown in which illustrative embodiments can be implemented. Domain 900 is an example of one of domains 320 of FIG. 3, for organizing reports according to a number of human capital management (HCM) information categories.

As depicted, domain 900 is a "training & development" domain, and includes categories 910-914. Each of categories 910-914 is an example of one of categories 330 of FIG. 3, for organizing reports according to a number of human capital management (HCM) information categories.

As depicted, domain 900 includes category 910 "education", category 912 "training", and category 914 "compliance". Each of categories 910-914 may correspond to an intent of the report, such as intent 224 of FIG. 2, as determined by an artificial intelligence system, such as artificial intelligence system 220 of FIG. 2.

Figure 10:
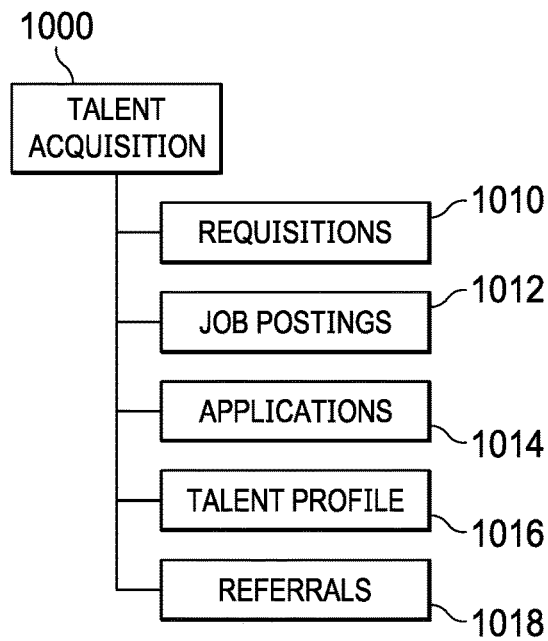
FIG. 10 is a block diagram illustrating a seventh domain of a taxonomy of Human Capital Management information in which illustrative embodiments can be implemented.

Referring now to FIG. 10, a block diagram of a seventh domain of a taxonomy of Human Capital Management information is shown in which illustrative embodiments can be implemented. Domain 1000 is an example of one of domains 320 of FIG. 3, for organizing reports according to a number of human capital management (HCM) information categories.

As depicted, domain 1000 is an "talent acquisition" domain, and includes categories 1010-1018. Each of categories 1010-1018 is an example of one of categories 330 of FIG. 3, for organizing reports according to a number of human capital management (HCM) information categories.

As depicted, domain 1000 includes category 1010 "requisitions", category 1012 "job postings", category 1014 "applications", category 1016 "talent profile", and category 1018 "referrals". Each of categories 1010-1018 may correspond to an intent of the report, such as intent 224 of FIG. 2, as determined by an artificial intelligence system, such as artificial intelligence system 220 of FIG. 2.

As depicted, category 1010 may correspond to one or more intent related to requisitions. These intents may include, but are not limited to, hire, and summary.

As depicted, category 1014 may correspond to one or more intent related to applications. These intents may include, but are not limited to, summary.

Figure 11:
FIG. 11 is a block diagram illustrating a eighth domain of a taxonomy of Human Capital Management information in which illustrative embodiments can be implemented.

Referring now to FIG. 11, a block diagram of an eighth domain of a taxonomy of Human Capital Management information is shown in which illustrative embodiments can be implemented. Domain 800 is an example of one of domains 320 of FIG. 3, for organizing reports according to a number of human capital management (HCM) information categories.

As depicted, domain 1100 is an "other" domain. Domain 1100 is a "catch-all" domain for the categorization of reports that do are not categorized into another domain in the taxonomy.

FIG. 12 illustrates an example of a recurrent neural network in which illustrative embodiments can be implemented. RNN 1200 might comprise part of artificial intelligence 220 in FIG. 2. RNNs are recurrent because they perform the same task for every element of a sequence, with the output being depended on the previous computations. RNNs can be thought of as multiple copies of the same network, in which each copy passes a message to a successor. Whereas traditional neural networks process inputs independently, starting from scratch with each new input, RNNs persistence information from a previous input that informs processing of the next input in a sequence.

RNN 1200 comprises an input vector 1202, a hidden layer 1204, and an output vector 1206. RNN 1200 also comprises loop 1208 that allows information to persist from one input vector to the next. RNN 1200 can be "unfolded" (or "unrolled") into a chain of layers, e.g., 1210, 1220, 1230 to write out RNN 1200 for a complete sequence. Unlike a traditional neural network, which uses different weights at each layer, RNN 1200 shares the same weights U, W across all steps. By providing the same weights and biases to all the layers 1210, 1220, 1230, RNN 1200 converts the independent activations into dependent activations.

The input vector 1212 at time step t−1 is $x_{t-1}$. The hidden state $h_{t-1}$ 1214 at time step t−1, which is required to calculate the first hidden state, is typically initialized to all zeroes. The output vector 1216 at time step t−1 is $y_{t-1}$. Because of persistence in the network, at the next time step t, the state $h_t$ 1224 of the layer 1220 is calculated based on the previous hidden state $h_{t-1}$ 1214 and the new input vector $x_t$ 1222. The hidden state acts as the "memory" of the network. Therefore, output $y_t$ 1226 at time step t depends on the calculation at time step t−1. Similarly, output vector $y_{t+1}$ 1236 at time step t+1 depends on hidden state $h_{t+1}$ 1234, calculated from hidden state $h_t$ 1224 and input vector $x_{t+1}$ 1232.

Training a neural network is conducted with standard mini-batch stochastic gradient descent-based approaches, where the gradient is calculated with the standard back-propagation procedure. In addition to the neural network parameters, which need to be optimized during the learning procedure, there are the weights for different distributions, which also need to be optimized based on the underlying dataset. Since the weights are non-negative, they are mapped to the range [0,1] while simultaneously requiring them summed to be 1.

In machine learning, a cost function estimates how the model is performing. It is a measure of how wrong the model is in terms of its ability to estimate the relationship between input x and output y. This is expressed as a difference or distance between the predicted value and the actual value. The cost function (i.e. loss or error) can be estimated by iteratively running the model to compare estimated predictions against known values of y during supervised learning. The objective of a machine learning model, therefore, is to find parameters, weights, or a structure that minimizes the cost function.

Gradient descent is an optimization algorithm that attempts to find a local or global minima of a function, thereby enabling the model to learn the gradient or direction that the model should take in order to reduce errors. As the model iterates, it gradually converges towards a minimum where further tweaks to the parameters produce little or zero changes in the loss. At this point the model has optimized the weights such that they minimize the cost function.

Neural networks are often aggregated into layers, with different layers performing different kinds of transformations on their respective inputs. A node layer is a row of nodes that turn on or off as input is fed through the network. Signals travel from the first (input) layer to the last (output) layer, passing through any layers in between. Each layer's output acts as the next layer's input.

Neural networks can be stacked to create deep networks. After training one neural net, the activities of its hidden nodes can be used as input training data for a higher level, thereby allowing stacking of neural networks. Such stacking makes it possible to efficiently train several layers of hidden nodes.

With reference next to FIG. 13, a flowchart illustrating a process for managing reports is depicted in accordance with an illustrative embodiment. The process of FIG. 6 can be implemented in one or more components of computer system 208 of FIG. 2, such as in report manager 206 of FIG. 2.

The process begins by identifying a subset of data fields for inclusion in a new report (step 1310). The process determines an intent for the new report based on the subset of data fields (step 1320). The intent is determined using a set of machine learning models trained from a set of existing reports and a taxonomy of Human Capital Management (HCM).

In one illustrative example, the taxonomy comprises a number of HCM domains including a payroll domain, a human resources domain, a time domain, a benefits domain, a performance management domain, a training & development domain, and a talent acquisition domain. The payroll domain can comprise a set of HCM domains including compensation, liens & garnishments, information, direct deposit, and taxes. The human resources domain can comprise a set of HCM domains including organization structure, employee, lifecycle transactions, job profile, policies, grievances, authorization, and cost center. The time domain can comprise a set of HCM domains including scheduling, attendance, and balance. The benefits domain can comprise a set of HCM domains including plans, costs, retirement, enrollments, dependents, and insurance. The performance management domain can comprise a set of HCM domains including reviews, succession planning, goals, recognition, and rewards. The training & development domain can comprise a set of HCM domains including education, training, and compliance. The talent acquisition domain can comprise a set of HCM domains including requisitions, job postings, applications, talent profile, and referrals.

Using the artificial intelligence system based on the intent determined by the artificial intelligence system, the process predicts a set of additional fields for the new report (step 1330). The process displays the set of additional fields in a graphical user interface on the display system (step 1340). The process terminates thereafter.

With reference next to FIG. 14, a flowchart illustrating a process for identifying a subset of data fields for inclusion in a new report is depicted in accordance with an illustrative embodiment. The process of FIG. 14 is one illustrative example in which step 1310 of FIG. 13 can be implemented.

The process begins by receiving a selection of the subset of data fields in a user input generated by at least one of a human machine interface or artificial intelligence system (step 1410). The subset of data fields is selected from data fields of human resources information generated in providing human resource services. The process continues to step 1320 of FIG. 13 thereafter.

Figure 15:
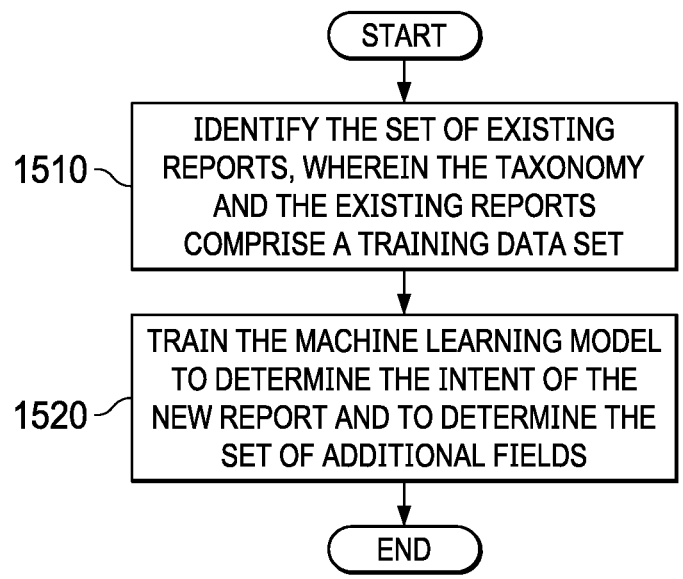
FIG. 15 is a flowchart illustrating a process for training a machine learning model depicted according to an illustrative example.

With reference next to FIG. 15, a process for modeling existing reports is depicted according to an illustrative example. The process of FIG. 15 can be implemented in one or more components of computer system 208 of FIG. 2, such as in report manager 206 of FIG. 2. The process of 15 can be used to train one or more machine learning models. The machine learning models can then be used in a process of managing reports, such as process 1300 of FIG. 13.

The process begins by identifying the set of existing reports (step 1510). Each existing report comprises a selected subset of the data fields. The taxonomy and the existing reports comprise a training data set.

Using the training data set, the process trains the machine learning model to determine the intent of the new report and to determine the set of additional fields (step 1520). The process terminates thereafter.

Figure 16:
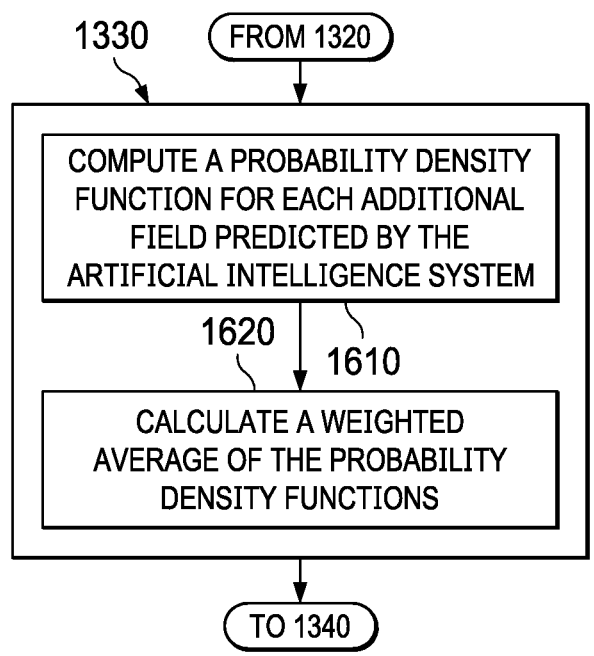
FIG. 16 is a flowchart illustrating a process for predicting a set of additional fields depicted according to an illustrative example.

With reference next to FIG. 16, a flowchart illustrating a process for generating a set of additional fields is depicted in accordance with an illustrative embodiment. The process of FIG. 16 is one illustrative example in which step 1330 of FIG. 13 can be implemented.

Continuing from step 1320, the process uses number of fully connected neural networks to compute a probability density function for each additional field predicted by the artificial intelligence system (step 1610). The process calculates a weighted average of the probability density functions (step 1620). Thereafter, the process proceeds to step 1340 of FIG. 13.

Figure 17:
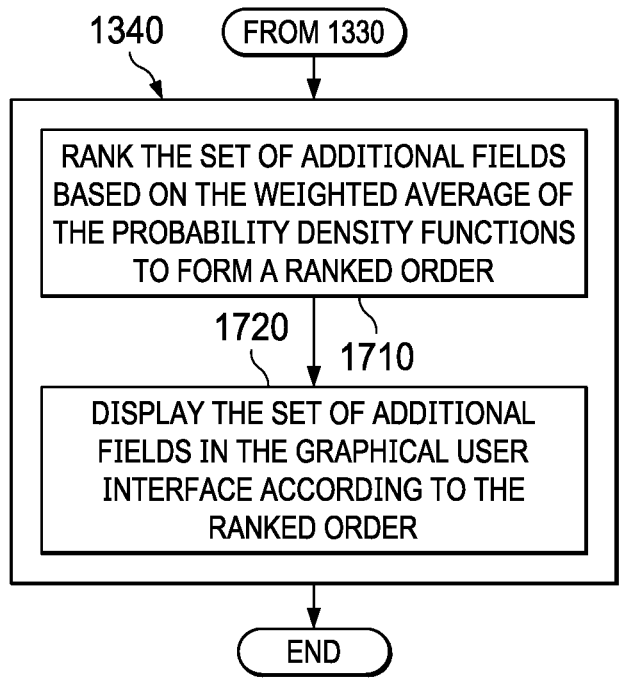
FIG. 17 is a flowchart illustrating a process for displaying a set of additional fields depicted according to an illustrative example.

With reference next to FIG. 17, a flowchart illustrating a process for generating a set of additional fields is depicted in accordance with an illustrative embodiment. The process of FIG. 17 is one illustrative example in which step 1340 of FIG. 13 can be implemented.

Continuing from step 1330, the process ranks the set of additional fields in based on the weighted average of the probability density functions to form a ranked order (step 1710). The process displays the set of additional fields in the graphical user interface according to the ranked order (step 1720), and terminates thereafter.

Figure 18:
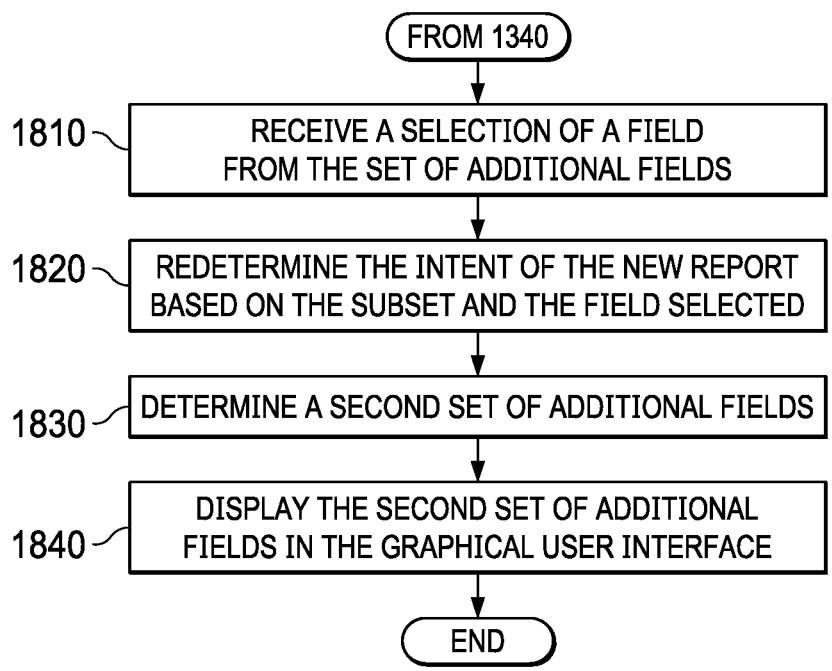
FIG. 18 is an illustration of a block diagram of a process for generating a set of suggested fields in real time depicted according to an illustrative example.

With reference next to FIG. 18, a process for generating a set of suggested fields in real time is shown according to an illustrative example. The process of FIG. 19 is one example in which process FIG. 13 can be implemented.

Continuing from step 1340, the process receives a receives a selection of a field from the set of additional fields (step 1810), and in response thereto, re-determines the intent of the new report based on the subset, including the additional field (step 1820). Using a machine learning model, the process determines a second set of additional fields (step 1830) based on the redetermined intent of the new report. The process displays the second set of additional fields in the graphical user interface on the display system (step 1840), and terminates thereafter.

Figure 19:
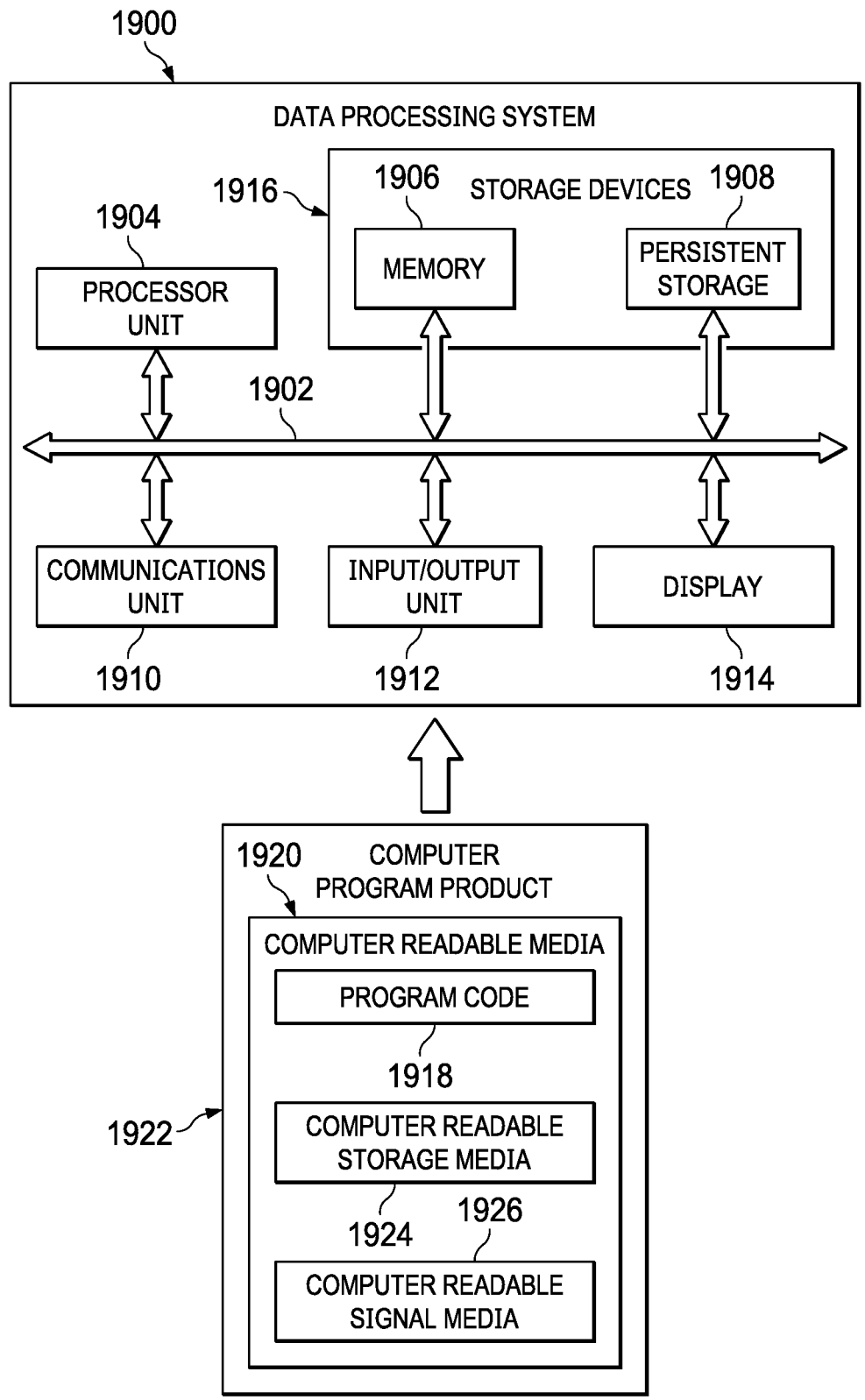
FIG. 19 is an illustration of a block diagram of a data processing system depicted in accordance with an illustrative embodiment.

Turning now to FIG. 19, an illustration of a block diagram of a data processing system is depicted in accordance with an illustrative embodiment. Data processing system 1900 may be used to implement one or more server computers 104, 106, and client devices 110 in FIG. 1, as well as computer system 208 in FIG. 2. In this illustrative example, data processing system 1900 includes communications framework 1902, which provides communications between processor unit 1904, memory 1906, persistent storage 1908, communications unit 1910, input/output unit 1912, and display 1914. In this example, communications framework 1902 may take the form of a bus system.

Processor unit 1904 serves to execute instructions for software that may be loaded into memory 1906. Processor unit 1904 may be a number of processors, a multi-processor core, or some other type of processor, depending on the particular implementation. In an embodiment, processor unit 1904 comprises one or more conventional general-purpose central processing units (CPUs). In an alternate embodiment, processor unit 1904 comprises one or more graphical processing units (CPUs).

Memory 1906 and persistent storage 1908 are examples of storage devices 1916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1916 may also be referred to as computer-readable storage devices in these illustrative examples. Memory 1906, in these examples, may be, for example, a random access memory or any other suitable volatile or non-volatile storage device. Persistent storage 1908 may take various forms, depending on the particular implementation.

For example, persistent storage 1908 may contain one or more components or devices. For example, persistent storage 1908 may be a hard drive, a flash memory, a rewritable optical disk, a rewritable magnetic tape, or some combination of the above. The media used by persistent storage 1908 also may be removable. For example, a removable hard drive may be used for persistent storage 1908. Communications unit 1910, in these illustrative examples, provides for communications with other data processing systems or devices. In these illustrative examples, communications unit 1910 is a network interface card.

Input/output unit 1912 allows for input and output of data with other devices that may be connected to data processing system 1900. For example, input/output unit 1912 may provide a connection for user input through at least one of a keyboard, a mouse, or some other suitable input device. Further, input/output unit 1912 may send output to a printer. Display 1914 provides a mechanism to display information to a user.

Instructions for at least one of the operating system, applications, or programs may be located in storage devices 1916, which are in communication with processor unit 1904 through communications framework 1902. The processes of the different embodiments may be performed by processor unit 1904 using computer-implemented instructions, which may be located in a memory, such as memory 1906.

These instructions are referred to as program code, computer-usable program code, or computer-readable program code that may be read and executed by a processor in processor unit 1904. The program code in the different embodiments may be embodied on different physical or computer-readable storage media, such as memory 1906 or persistent storage 1908.

Program code 1918 is located in a functional form on computer-readable media 1920 that is selectively removable and may be loaded onto or transferred to data processing system 1900 for execution by processor unit 1904. Program code 1918 and computer-readable media 1920 form computer program product 1922 in these illustrative examples. In one example, computer-readable media 1920 may be computer-readable storage media 1924 or computer-readable signal media 1926.

In these illustrative examples, computer-readable storage media 1924 is a physical or tangible storage device used to store program code 1918 rather than a medium that propagates or transmits program code 1918. Alternatively, program code 1918 may be transferred to data processing system 1900 using computer-readable signal media 1926.

Computer-readable signal media 1926 may be, for example, a propagated data signal containing program code 1918. For example, computer-readable signal media 1926 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1900 are not meant to provide architectural limitations to the manner in which different embodiments may be implemented. The different illustrative embodiments may be implemented in a data processing system including components in addition to or in place of those illustrated for data processing system 1900. Other components shown in FIG. 19 can be varied from the illustrative examples shown. The different embodiments may be implemented using any hardware device or system capable of running program code 1918.

The illustrative embodiments described herein provide a computer-implemented a method, computer system, and computer program product for managing reports. A subset of data fields is identified for inclusion in a new report. An intent of the new report is determined based on the subset of data fields. The intent is determined using a set of machine learning models trained from a set of existing reports and a taxonomy of human capital management (HCM) information categories. Based on the intent determined by the artificial intelligence system, a set of additional fields is predicted for the new report. The set of the additional fields is displayed in a graphical user interface on a display system.

Therefore, the illustrative embodiments described herein provide a technical solution to the technical problem of generating reports provides a technical effect in which a new reports are generated more easily and quickly while requiring less knowledge or training from an operator.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A report management system, comprising:
    a computer system; and
    a report manager in the computer system, wherein the report manager is configured:
    to identify a subset of data fields for inclusion in a new report;
    to identify a set of existing reports comprising the subset of data fields;
    to train a machine learning model comprising a neural network, by the computer system, with a training data set based on a taxonomy of human capital management (HCM) information and the set of existing reports;
    to determine, using the machine learning model an intent for the new report by comparing the subset of data fields to an index of intents of the set of existing reports and data fields, the data fields including the subset of data fields;
    to predict, using the machine learning model based on the intent determined by the machine learning model and the index, a set of additional fields for the new report by comparing the subset of data fields to the index;
    to compute, with the neural network using the intent determined by the machine learning model based on the subset of data fields, a plurality of probability density functions of likelihoods of inclusion of the set of additional fields in the new report;
    to rank the set of additional fields based on the likelihoods of inclusion; and
    to display the set of additional fields in a graphical user interface on a display system according to the ranking.

2. The report management system of claim 1, wherein the taxonomy comprises a number of HCM domains including a payroll domain, a human resources domain, a time domain, a benefits domain, a performance management domain, a training & development domain, and a talent acquisition domain.

3. The report management system of claim 2, wherein each HCM domain comprises a set of categories related to a corresponding HCM domain;
- wherein the payroll domain comprises a set of HCM domains including compensation, liens & garnishments, information, direct deposit, and taxes;
- wherein the human resources domain comprises a set of HCM domains including organization structure, employee, lifecycle transactions, job profile, policies, grievances, authorization, and cost center;
- wherein the time domain comprises a set of HCM domains including scheduling, attendance, and balance;
- wherein the benefits domain comprises a set of HCM domains including plans, costs, retirement, enrollments, dependents, and insurance;
- wherein the performance management domain comprises a set of HCM domains including reviews, succession planning, goals, recognition, and rewards;
- wherein the training & development domain comprises a set of HCM domains including education, training, and compliance; and
- wherein the talent acquisition domain comprises a set of HCM domains including requisitions, job postings, applications, talent profile, and referrals.

4. The report management system of claim 1, wherein in identifying the subset of data fields, the report manager is further configured:
- to receive a selection of the subset of data fields in a user input generated by at least one of a human machine interface or an artificial intelligence system, wherein the subset of data fields is selected from the data fields, comprising human resources information generated in providing human resource services.

5. The report management system of claim 1, wherein the report manager is further configured:
- to identify the set of existing reports, each existing report comprising a selected subset of the data fields, wherein the taxonomy and the set of existing reports comprise a training data set; and
- to train the machine learning model using the training data set to determine the intent of the new report and to determine the set of additional fields.

6. The report management system of claim 5, wherein in predicting the set of additional fields, the report manager is further configured:
- to compute, with a number of fully connected neural networks, the probability density function for each additional field predicted by the machine learning model; and
- to calculate a weighted average of the plurality of probability density functions.

7. The report management system of claim 6, wherein in displaying the set of additional fields, the report manager is further configured:
- to rank the set of additional fields based on the weighted average of the plurality of probability density functions to form a ranked order; and
- to display the set of additional fields in the graphical user interface according to the ranked order.

8. A method for managing reports, the method comprising:
- identifying, by a computer system, a subset of data fields for inclusion in a new report;
- identifying, by the computer system, a set of existing reports comprising the subset of data fields;
- training, by the computer system, a machine learning model comprising at least a neural network, using a training data set based on a taxonomy of human capital management (HCM) information and the set of existing reports;
- determining, by the machine learning model, an intent for the new report by comparing the subset of data fields to an index of intents of the set of existing reports and data fields, the data fields including the subset of data fields;
- predicting, by the machine learning model based on the intent determined by the machine learning model and the index, a set of additional fields for the new report by comparing the subset of data fields to the index;
- computing, by the neural network using the intent determined by the machine learning model based on the subset of data fields, a plurality of probability density functions of likelihoods of inclusion of the set of additional fields in the new report;
- ranking, by the computer system, the set of additional fields based on the likelihoods of inclusion; and
- displaying, by the computer system on a display system, the set of additional fields in a graphical user interface on the display system according to a ranking based on the plurality of probability density functions.

9. The method of claim 8, wherein the taxonomy comprises a number of HCM domains including a payroll domain, a human resources domain, a time domain, a benefits domain, a performance management domain, a training & development domain, and a talent acquisition domain.

10. The method of claim 9, wherein each HCM domain comprises a set of Categories related to a corresponding HCM domain;
- wherein the payroll domain comprises a set of HCM domains including compensation, liens & garnishments, information, direct deposit, and taxes;
- wherein the human resources domain comprises a set of HCM domains including organization structure, employee, lifecycle transactions, job profile, policies, grievances, authorization, and cost center;
- wherein the time domain comprises a set of HCM domains including scheduling, attendance, and balance;
- wherein the benefits domain comprises a set of HCM domains including plans, costs, retirement, enrollments, dependents, and insurance;
- wherein the performance management domain comprises a set of HCM domains including reviews, succession planning, goals, recognition, and rewards;
- wherein the training & development domain comprises a set of HCM domains including education, training, and compliance; and
- wherein the talent acquisition domain comprises a set of HCM domains including requisitions, job postings, applications, talent profile, and referrals.

11. The method of claim 8, wherein identifying the subset of data fields comprises:
- receiving, by the computer system, a selection of the subset of data fields in a user input generated by at least one of a human machine interface or an artificial intelligence system, wherein the subset of data fields is selected from the data fields, comprising human resources information generated in providing human resource services.

12. The method of claim 8, further comprising:
   identifying, by the computer system, the set of existing reports, each existing report comprising a selected subset of the data fields, wherein the taxonomy and the set of existing reports comprise a training data set; and
   training, by the computer system using the training data set, the machine learning model to determine the intent of the new report and to determine the set of additional fields.

13. The method of claim 12, wherein predicting the set of additional fields comprises:
   computing, with a number of fully connected neural networks, the probability density function for each additional fields predicted by the machine learning model; and
   calculating a weighted average of the plurality of probability density functions.

14. The method of claim 13, wherein displaying the set of additional fields comprises:
   ranking, by the computer system, the set of additional fields based on the weighted average of the plurality of probability density functions to form a ranked order; and
   displaying, by the computer system on the display system, the set of additional fields in the graphical user interface according to the ranked order.

15. A computer program product for managing reports, the computer program product comprising:
   a computer-readable storage media; and
   program code, stored on the computer-readable storage media, for identifying, by a computer system, a subset of data fields for inclusion in a new report;
   program code, stored on the computer-readable storage media, for identifying a set of existing reports comprising the subset of data fields;
   program code, stored on the computer-readable storage media, for training a machine learning model comprising a neural network, using a training data set based on a taxonomy of human capital management (HCM) information and the set of existing reports;
   program code, stored on the computer-readable storage media, for determining, by the machine learning model, an intent for the new report by comparing the subset of data fields to an index of intents of the set of existing reports and data fields, the data fields including the subset of data fields;
   program code, stored on the computer-readable storage media, for predicting, by the machine learning model based on the intent determined by the machine learning model and the index, a set of additional fields for the new report by comparing the subset of data fields to the index;
   program code, stored on the computer-readable storage media, for computing, by the neural network using the intent determined by the machine learning model based on the subset of data fields, a plurality of probability density functions of likelihoods of inclusion of the set of additional fields in the new report;
   program code, stored on the computer-readable storage media, for ranking, by the computer system, the set of additional fields based on the likelihoods of inclusion; and
   program code, stored on the computer-readable storage media, for displaying, by the computer system on a display system, the set of additional fields in a graphical user interface on the display system according to a ranking based on the plurality of probability density functions.

16. The computer program product of claim 15, wherein the taxonomy comprises a number of HCM domains including a payroll domain, a human resources domain, a time domain, a benefits domain, a performance management domain, a training & development domain, and a talent acquisition domain.

17. The computer program product of claim 16, wherein each HCM domain comprises a set of Categories related to a corresponding HCM domain;
   wherein the payroll domain comprises a set of HCM domains including compensation, liens & garnishments, information, direct deposit, and taxes;
   wherein the human resources domain comprises a set of HCM domains including organization structure, employee, lifecycle transactions, job profile, policies, grievances, authorization, and cost center;
   wherein the time domain comprises a set of HCM domains including scheduling, attendance, and balance;
   wherein the benefits domain comprises a set of HCM domains including plans, costs, retirement, enrollments, dependents, and insurance;
   wherein the performance management domain comprises a set of HCM domains including reviews, succession planning, goals, recognition, and rewards;
   wherein the training & development domain comprises a set of HCM domains including education, training, and compliance; and
   wherein the talent acquisition domain comprises a set of HCM domains including requisitions, job postings, applications, talent profile, and referrals.

18. The computer program product of claim 15, wherein the program code for identifying the subset of data fields comprises:
   program code for receiving a selection of the subset of data fields in a user input generated by at least one of a human machine interface or an artificial intelligence system, wherein the subset of data fields is selected from the data fields, comprising human resources information generated in providing human resource services.

19. The computer program product of claim 15, further comprising:
   program code, stored on the computer-readable storage media, for identifying the set of existing reports, each existing report comprising a selected subset of the data fields, wherein the taxonomy and the set of existing reports comprise a training data set; and
   program code, stored on the computer-readable storage media, for training, using the training data set, the machine learning model to determine the intent of the new report and to determine the set of additional fields.

20. The computer program product of claim 19, wherein the program code for predicting the set of additional fields further comprises:
   program code for computing, with a number of fully connected neural networks, the probability density function for each additional field predicted by the machine learning model; and
   program code for calculating a weighted average of the plurality of probability density functions.

21. The computer program product of claim 20, wherein the program code for displaying the set of additional fields further comprises:
- program code for ranking the set of additional fields based on the weighted average of the plurality of probability density functions to form a ranked order; and
- program code for displaying, on the display system, the set of additional fields in the graphical user interface according to the ranked order.

* * * * *